US012560558B2

(12) United States Patent
Barr

(10) Patent No.: US 12,560,558 B2
(45) Date of Patent: Feb. 24, 2026

(54) SAMPLING APPARATUS AND METHOD

(71) Applicant: Proserv UK Ltd, Westhill (GB)

(72) Inventor: Richard Barr, Westhill (GB)

(73) Assignee: Proserv UK Ltd, Aberdeenshire (GB)

( * ) Notice: Subject to any disclaimer, the term of this patent is extended or adjusted under 35 U.S.C. 154(b) by 132 days.

(21) Appl. No.: 18/569,424

(22) PCT Filed: Jun. 8, 2022

(86) PCT No.: PCT/EP2022/065554
§ 371 (c)(1),
(2) Date: Dec. 12, 2023

(87) PCT Pub. No.: WO2022/263253
PCT Pub. Date: Dec. 22, 2022

(65) Prior Publication Data
US 2024/0125714 A1    Apr. 18, 2024

(30) Foreign Application Priority Data
Jun. 14, 2021    (GB) ..................................... 2108471

(51) Int. Cl.
G01N 22/00        (2006.01)
G01F 23/284        (2006.01)
(Continued)

(52) U.S. Cl.
CPC ............... G01N 22/00 (2013.01); G01N 1/20 (2013.01); G01N 1/2035 (2013.01);
(Continued)

(58) Field of Classification Search
CPC ........ G01N 22/00; G01N 1/20; G01N 1/2035; G01N 1/2042; G01N 1/2247;
(Continued)

(56) References Cited

U.S. PATENT DOCUMENTS

2003/0233865 A1 * 12/2003 Gupta ................ G01N 15/0826
73/38
2006/0137479 A1    6/2006 Gilbert
(Continued)

OTHER PUBLICATIONS

International Preliminary Report on Patentability for PCT/EP2022/065554 dated Dec. 28, 2023.
(Continued)

*Primary Examiner* — Raul J Rios Russo
(74) *Attorney, Agent, or Firm* — Harness, Dickey & Pierce, P.L.C.

(57) ABSTRACT

An apparatus for sampling a fluid from a flowline comprises a housing and a pressure control barrier moveably mounted in the housing. The apparatus comprises a sample chamber within the housing on a first side of the pressure control barrier and being fluidly connectable to the flowline for receiving a fluid sample from the flowline, and a pressure control chamber within the housing on an opposite second side of the pressure control barrier, wherein pressure applied within the pressure control chamber controls pressure of the fluid sample within the sample chamber. The apparatus comprises a guided wave radar device for determining a property of the fluid sample within the sample chamber.

23 Claims, 5 Drawing Sheets

(51) Int. Cl.
   *G01F 23/2962* (2022.01)
   *G01N 1/20* (2006.01)
   *G01N 1/22* (2006.01)

(52) U.S. Cl.
   CPC ......... *G01N 1/2042* (2013.01); *G01N 1/2247*
   (2013.01); *G01F 23/284* (2013.01); *G01F*
   *23/2962* (2013.01)

(58) Field of Classification Search
   CPC .... G01F 23/2962; G01F 23/284; G01S 7/411;
   G01S 15/88; G01S 13/88; G01S 15/08
   USPC ........................................................ 324/639
   See application file for complete search history.

(56) References Cited

U.S. PATENT DOCUMENTS

| | | | |
|---|---|---|---|
| 2007/0204750 A1 | 9/2007 | Liu et al. | |
| 2008/0149819 A1* | 6/2008 | Zhdaneev | G01N 21/3581 |
| | | | 250/336.1 |
| 2010/0268488 A1* | 10/2010 | Bismarck | G01N 15/0826 |
| | | | 702/50 |
| 2012/0186664 A1* | 7/2012 | DiLeo | G01N 5/025 |
| | | | 73/29.02 |
| 2013/0315024 A1* | 11/2013 | Ringgenberg | E21B 49/082 |
| | | | 366/144 |
| 2014/0233015 A1* | 8/2014 | Mander | G01N 21/49 |
| | | | 356/440 |
| 2014/0326038 A1 | 11/2014 | Fauveau | |
| 2020/0324224 A1 | 10/2020 | Allouche et al. | |

OTHER PUBLICATIONS

Jaworski A J et al: "On-line measurement of separation dynamics in primary gas/oil/water separators: Challenges and technical solutions—A review," Journal of Petroleum Science and Engineering, Elsevier, Amsterdam, NL, vol. 68, No. 1-2, Sep. 1, 2009 (Sep. 1, 2009), pp. 47-59, XP026419270, ISSN: 0920-4105, [retrieved on Jun. 21, 2009].

European Search Report for UK Application No. 2108471.0 dated Mar. 18, 2022.

International Search Report for International Application No. PCT/EP2022/065554 dated Sep. 19, 2022.

* cited by examiner

SAMPLING APPARATUS AND METHOD

CROSS-REFERENCE TO RELATED APPLICATIONS

This application is a national phase under 35 U.S.C. § 371 of PCT International Application No. PCT/EP2022/065554 which has an International filing date of Jun. 8, 2022, which claims priority to United Kingdom Application No. 2108471.0, filed Jun. 14, 2021, the entire contents of each of which are hereby incorporated by reference.

FIELD

The present disclosure relates to an apparatus and method for sampling a fluid from a flowline, such as a flowline associated with wellbore operations.

BACKGROUND

Many industries, such as the oil and gas industry, manage the flow of fluids through flowlines, such as is the case of produced hydrocarbons from subterranean reservoirs. It can often be desirable to take a sample of the fluid in such flowlines for processing and testing, as obtaining information on the fluid sample, such as its contents or media, is often critical for operational decisions to be made.

While it is known to provide a sample chamber for receiving a sample of fluid, such sample chambers generally do not provide much information on the contents or media of the fluid therein. Instead, the samples are often transported to a separate location for processing or testing. However, this can be undesirable, particularly if the samples are taken at a remote location, such as an offshore oil rig, where the samples may require storage for a significant amount of time before being transported to the location for processing or testing.

SUMMARY

An aspect of the present disclosure relates to an apparatus for sampling a fluid from a flowline, the apparatus comprising:
  a housing;
  a pressure control barrier moveably mounted in the housing;
  a sample chamber within the housing on a first side of the pressure control barrier and being fluidly connectable to the flowline for receiving a fluid sample from the flowline;
  a pressure control chamber within the housing on an opposite second side of the pressure control barrier, wherein pressure applied within the pressure control chamber controls pressure of the fluid sample within the sample chamber; and
  a guided wave radar device for determining a property of the fluid sample within the sample chamber.

Providing the apparatus with a guided wave radar device may provide a number of advantages. In some examples, the guided wave radar device may be used to determine an interface level between two or more media of the fluid sample. The ability to obtain information on the level of each media in the sample at the location of sampling may enable a quick decision to be made as to the processing of the sample. In one scenario, for example, it might be determined that the sample contains only a certain media that does not require further testing or processing. It might therefore be advantageous in this case to dispose of the sample at the location of sampling and avoid the cost and time associated with transporting the apparatus to a separate processing or testing location, which might be the case if the apparatus is used at a remote location, such as an offshore oil rig. In another scenario, however, it might be determined that the sample contains a sufficient volume of a different media requiring further analysis of the sample, and therefore that transportation to another location is indeed necessary.

In other examples, the fluid sample from the flowline may contain only a single media. In this case, the guided wave radar device may be used to determine a permittivity of the fluid sample, which is discussed in more detail below.

The flowline may be associated with wellbore operations, such as the production of hydrocarbons and associated components (such as water, solids etc.) from a wellbore, the production of water from a wellbore, the injection of fluids (e.g., water, gas etc.) into a wellbore, and the like. In this respect, the apparatus may be for sampling a fluid from a well flowline. In some examples, a well flowline may be considered to be any flowline which handles fluids, with or without any solids content, which are produced from or being injected into a wellbore. The well flowline may be located at an onshore location, offshore location, topside location, subsea location, subterranean location and/or the like.

The guided wave radar device may be used for determining an interface level between two or more media of the fluid sample which may have stratified (i.e., separated) within the sample chamber.

The apparatus may be configured to sample a multiphase fluid from a flowline, which may comprise a mixture of liquids, gases and solids. In one example, the fluid may comprise a mix of oil, gas, water and/or solids.

The fluid in the flowline may be at a pressure of around 50 bar and 60° C. However, in other examples the pressure and/or temperature may be greater or less than 50 bar and 60° C.

The pressure control chamber may be used to control a rate at which fluid is received within the sample chamber such that the fluid sample may be maintained in the sample chamber at a desired pressure, e.g. a pressure corresponding to that of the fluid in the flowline. When the fluid is initially sampled, there may be a certain volume of a solute (e.g. gas) in solution in a solvent (e.g. oil) in the sample chamber. Therefore, another benefit of providing the apparatus with a guided wave radar device is that the shrinkage factor of a certain media (e.g. oil) in the fluid sample can be determined, as will be described in more detail below.

The guided wave radar device may comprise a probe rod. The probe rod may extend within the housing. The probe rod may extend from an upper region of the housing. The probe rod may extend from a lower region of the housing. The probe rod may extend through a bore formed through the pressure control barrier. The guided wave radar device may be operated by sending an electromagnetic signal (e.g. a microwave signal) through the probe rod. A transceiver may be provided in connection with the probe rod. The transceiver may be located at the upper region of the housing, or the transceiver may be located at the lower region of the housing, depending on the position of the probe rod. The transceiver may be configured for sending the electromagnetic signal through the probe rod. The transceiver may also be configured for receiving a return electromagnetic signal reflected at, for example, the interface level between two media having different characteristics (such as a different dielectric permittivity or dielectric constant). The transceiver may use this information in a time of flight calculation to determine an interface level between the two media (i.e. a distance from the transceiver to the interface level).

Where the fluid sample from the flowline contains only one media, the transceiver may be configured to receive a return electromagnetic signal reflected at a known point of the probe rod. The known point of the probe rod may be an end point of the probe rod. The known point of the probe rod may be determined by subtracting the height of the pressure control barrier from the height of the housing. The known point of the probe rod may be determined by subtracting the height of the pressure control barrier plus the height of the pressure control chamber, where the pressure control chamber has retained a certain volume of buffer fluid during the sampling process, from the height of the housing. The known point of the probe rod may be such that the electromagnetic signal travels the exact full length of the sample chamber.

The time taken for the electromagnetic signal to travel from the transceiver to the known point of the probe rod and back to the transceiver may vary in accordance with the dielectric permittivity of the media in which the probe rod extends. Therefore, the electromagnetic signal reflected at the known point of the probe rod may be used in a calculation to determine a permittivity of that media. For example, the speed of light will travel slower in a media having a higher dielectric permittivity, which will increase the time taken for the electromagnetic signal to travel from the transceiver to the known point of the probe rod and back to the transceiver. On the other hand, the speed of light will travel faster in a media with a lower dielectric permittivity and this will therefore reduce the time taken for the electromagnetic signal to travel from the transceiver to the known point of the probe rod and back to the transceiver.

In other examples, a separate transmitter and receiver may be provided instead of the transceiver described above.

The provision of a guided wave radar device may provide a number of advantages over other types of measurement devices. For example, as the electromagnetic signals travel at the speed of light through the probe rod, the determination of an interface level between two media in the sample chamber is independent of certain characteristics of the media, such that more accurate time of flight or time domain reflectometry may be utilised. Therefore, in some examples a guided wave radar device may be preferred over, for example, an acoustic transceiver arrangement whose measurements may be dependent on the speed of sound in each of the media, which may vary based on the conditions of the media, such as temperature, etc. Moreover, a guided wave radar device may be unaffected by changes in the certain properties of the media, such as changes in temperature, density, viscosity, etc., thereby providing more accurate and consistent readings.

The apparatus may be configured to permit depressurisation of the sample chamber. The apparatus may be configured to be depressurised (e.g. to a target pressure) such that some or all of one or more media in the sample chamber may be expelled therefrom. For example, during depressurisation of the sample chamber, some or all of the gas in solution may separate from the oil and rise above an oil-gas interface defined between the two media, e.g. into a gas plenum or gas cap. At this point, the interface detector can take another reading to determine any change in the level of the oil-gas interface. This information can be used to calculate a new volume of each media in the fluid sample, at reduced pressure, and therefore the shrinkage factor of the certain media can be determined without requiring separate laboratory testing; that is, the apparatus may be provided with all components necessary to determine the shrinkage factor at the location of sampling. Such measurements can provide useful information on the content of the fluid sample, enabling quick operational decisions to be made as to the processing of the sample. In example applications relating to the oil and gas industry, a more accurate oil content can be understood or derived from the flowline, taking into account the shrinkage factor of the oil, which for example may enable or assist with fiscal metering processes.

It will be appreciated here that the apparatus may be equally used in any number of other applications outside of the oil and gas industry. Moreover, it should be noted that any reference herein to "top", "down", "up" or "bottom" should be understood as in relation to gravity.

Furthermore, it will be appreciated that in use the apparatus may be oriented such that reliable readings of an interface level between two media in the fluid sample can be taken. For example, it might be important that the apparatus is oriented vertically with respect to gravity so that separation or stratification of the two or more media of the fluid sample may be consistently achieved (i.e. due to differences in density of the media).

The apparatus may comprise a stand assembly, to permit appropriate self-support of the apparatus in a desired orientation. In some examples, the sampling apparatus may be configured to be mounted on the flowline, for example via a clamping system, strap system etc.

The apparatus may be configured to obtain a sample of fluid having properties corresponding to the properties of the fluid in the flowline. For example, such properties may relate to pressure, temperature, density, viscosity, etc. The fluid may be maintained at constant pressure and/or temperature during the sampling process to obtain a sample at the same pressure and/or temperature as the fluid in the flowline. This may enable a sample to be obtained at flowline conditions.

The pressure control chamber may be configured to control a rate at which fluid enters the sample chamber. As such, the pressure control chamber may be configured to control a pressure of the fluid as it enters the sample chamber. The pressure control chamber may be provided in fluid communication with a pressure control arrangement. The pressure control arrangement may be configured to control a rate at which fluid enters the sample chamber. The pressure control arrangement may be configured to control a pressure of the fluid as it enters the sample chamber.

The pressure control chamber may contain a buffer fluid. The buffer fluid may provide a back pressure against the flow of fluid entering the sample chamber from the flowline. The back pressure may help to maintain a constant pressure of fluid as the fluid from the flowline enters the sample chamber. This may enable the fluid to be sampled at (exactly or approximately) the same pressure as the fluid in the flowline. In some examples, the buffer fluid may comprise a mixture of methanol, ethylene and glycol, which may be referred to as "MEG". However, it will be appreciated that the buffer fluid may comprise other suitable liquids and/or gases known in the art.

In one example, the pressure control arrangement may comprise a hydraulic accumulator. The hydraulic accumulator may be in fluid communication with the pressure control chamber. The hydraulic accumulator may be controlled by a control module. The control module may be configured to receive a signal indicative of a pressure inside the flowline. The control module may be configured to receive a signal indicative of a pressure inside the sample chamber. The control module may be configured to receive a signal indicative of a pressure inside the pressure control chamber. The control module may be configured to instruct the hydraulic module to operate in accordance with one or more of the received pressure signals.

The buffer fluid may be in fluid communication with the hydraulic accumulator. The pressure control arrangement may be configured to permit the buffer fluid to be displaced from the pressure control chamber (e.g. when the pressure in the sample chamber is sufficiently high to drive the pressure control barrier to reduce the volume of the pressure control chamber). The control module may be configured to monitor and control a pressure of buffer fluid in the pressure control chamber, such that a rate of fluid flowing into the sample chamber may be regulated and controlled.

The pressure control arrangement may also be configured to deliver the buffer fluid to the pressure control chamber. In other examples, a dedicated filling port may be provided on the housing for the buffer fluid to be delivered to the pressure control chamber. A suitable pump may be provided to deliver the buffer fluid at a certain pressure to the pressure control chamber. The pressure of the buffer fluid may be selected in accordance with expected operating conditions of the apparatus, e.g. an expected pressure of the fluid to be received in the sample chamber. In some examples, the apparatus may be provided pre-charged with pressurised buffer fluid.

In some examples, it might be desirable to provide the buffer fluid at approximately the same pressure as the fluid in the flowline. Then, when it is required to take a sample of fluid from the flowline, the pressure of the buffer fluid may be reduced to achieve an acceptable rate of fluid flow into the sample chamber.

The pressure control arrangement may comprise a choke valve. The choke valve may be configured to control a rate at which the buffer fluid is displaced from the pressure control chamber. The buffer fluid may be selected to have one or more properties that enable a particular back pressure to be achieved, such as a particular density, viscosity, etc. Furthermore, a dimension of the choke valve may be selected to provide a particular flow regime as the buffer fluid exits the pressure control chamber through the choke valve.

The pressure control chamber may comprise mechanical means for controlling the rate at which the buffer fluid is displaced from the pressure control chamber. The mechanical means may comprise a rotary arrangement. For example, the rotary arrangement may comprise a helical screw and the pressure control barrier may comprise a plate operatively connected to the helical screw. The plate may be configured to rotate relative to the helical screw to produce linear movement thereof within the housing. The rate of fluid flow into the sample chamber may be controlled by the linear movement of the plate.

The apparatus may be provided with means for maintaining or modifying a temperature of the fluid sample in the sample chamber. The apparatus may be provided with means for maintaining or modifying a temperature of the buffer fluid in the pressure control chamber. For example, a thermal jacket, blanket, tape, etc., may be suitably provided to maintain and/or modify a temperature of the fluids. In some examples, the temperature of the fluid sample may be controlled in accordance with a required temperature change to calculate the shrinkage factor of one or more media (e.g. oil) of the fluid sample.

The sample chamber may comprise a sample inlet. The sample inlet may be configured to permit fluid from the flowline to enter the sample chamber. The sample inlet may be selectively openable. The sample inlet may comprise a valve. The valve may be configured to open and close the sample inlet. In some examples, the sample inlet may comprise a non-return valve. The sample inlet may comprise a port or an orifice, etc instead of or in combination with the valve. The sample inlet may be connectable to the flowline. In one example, the sample inlet may also be configured to depressurise the sample chamber, when the apparatus is disconnected from the flowline. In other examples, however, the apparatus may alternatively or additionally be provided with a separate depressurisation port or valve.

The apparatus may include a pressure relief valve to prevent over-pressurisation of the sample chamber above a certain value. The apparatus may be provided with a gauge for indicating a pressure and/or temperature inside the sample chamber. The gauge may help to monitor and control the reduction of pressure inside the sample chamber.

During the sampling process a volume of buffer fluid may be retained in the pressure control chamber. Thereafter, fluid communication with the sample chamber and the flowline may be stopped and the pressure control chamber may be further reduced in volume, such that the volume of the sample chamber may be increased. Consequently, the pressure of the sample chamber may be reduced, provided that a temperature of the fluid in the sample chamber is kept sufficiently constant in accordance with general gas equations. The volume of buffer fluid retained in the pressure control chamber may be such that a required reduction in pressure may be obtained to determine a shrinkage factor, i.e. to permit sufficient expansion of the sample chamber.

In some examples, the sample chamber may be depressurised such that a number of staged measurements can be taken, for example, at 50 bar, 40 bar, 30 bar, etc. This may assist in determining a shrinkage factor.

The pressure control barrier may comprise a piston member. The pressure control barrier may comprise a first (outer) sealing arrangement configured to seal against the housing. The pressure control barrier may comprise a second (inner) sealing arrangement configured to seal against the probe rod. The first and/or second sealing arrangements may be configured to create a seal between the sample chamber and pressure control chamber such that any fluid received in the sample chamber is prevented from entering the pressure control chamber. By virtue of the required relative movement between the pressure control barrier and the housing the sealing arrangements may define dynamic sealing arrangements. The sealing arrangements may be bi-directional to ensure isolation of any pressure differential across the piston in reverse directions.

In some examples, interference between the pressure control barrier and an inner surface of the housing and/or outer surface of the probe rod may provide the sealing arrangement. Alternatively, or additionally, the sealing arrangements may comprise one or more sealing members, such as O-rings, chevron seal stacks, piston rings and/or the like.

In some examples, the pressure control chamber may comprise a bladder or bellows arrangement. The pressure control barrier may be defined by a skin or cover of the bladder or bellows arrangement. The skin of the bladder or bellows arrangement may be configured to be compressed against an inner surface of the housing and an outer surface of the probe rod, by virtue of pressure applied within the pressure control chamber, to provide the first and second sealing arrangements mentioned above.

The housing may comprise a housing bore, wherein the pressure control barrier may be mounted within the housing bore. The housing bore may be cylindrical. The housing bore may define the volume of the housing. The housing may comprise a cylinder, for example provided by a tubular body. The housing may be formed of any suitable material, such as a metal or metal alloy, a composite material, a polymer and/or the like. The pressure control barrier may define a shape complimentary to a bore of the housing. The pressure control barrier may comprise a disc piston. The pressure control barrier may comprise a vane piston. The pressure control barrier may be configured for sliding engagement with an inner surface of the housing. The pressure control barrier may comprise one or more bearing surfaces to facilitate sliding engagement.

The housing may be sized in accordance with the volume of fluid to be sampled from the flowline. Additionally or alternatively, the housing may be sized in accordance with the volume of buffer fluid in the pressure control chamber required to provide sufficient control over the flow of fluid entering the sample chamber. In some examples, the housing may be sized such that the sample chamber can receive 1 litre, 2 litres, 4 litres, 8 litres, etc., of fluid from the flowline.

The pressure control barrier may be provided with a position indicator. The position indicator may indicate a position of the pressure control barrier in the housing. The position indicator may indicate a volume of fluid which has entered the sample chamber. The position indicator may indicate a volume of buffer fluid which has been displaced from the pressure control chamber. In one example, the position indicator may comprise a magnet fixed to the pressure control barrier. The magnet may be configured to cooperate with a magnetic follower located externally on the housing (or at least visible externally of the housing), such that the indicator follower can indicate the position of the pressure control barrier in the housing. However, other position indicators may alternatively or additionally be used.

In some examples, the apparatus may be operated by observing the position indicator of the pressure control barrier and modifying the rate at which the position indicator (and the pressure control barrier) moves relative to the housing, and therefore modifying the rate at which fluid enters the sample chamber, e.g. by controlling the pressure of the buffer fluid.

The apparatus may include one or more side ports. The side ports may be arranged along a length of the housing. The side ports may permit one or more sub-samples of fluid to be taken from the sample chamber. As such, the side ports may be defined as drain ports. Since the height or level of an interface between two media can be determined using the interface detector, it can be known which media is present at the height or level of the one or more side ports. This may permit a sub-sample of one of the media to be removed separately from the others, permitting individual processing and testing of each media if required. Moreover, this may allow the sub-sample to be certified at the location of sampling for certain types of transportation, as well as enabling samples to be allocated for certain types of full-composition laboratory tests.

The pressure control chamber may be configured to drive the pressure control barrier in order to move the fluid sample within the sample chamber such that a certain media is brought into alignment with a particular side port. The pressure inside the pressure control chamber may be modified such that a pressure differential is applied across the pressure control barrier to reduce the volume of the sample chamber. The pressure control chamber may be configured to reduce the volume of the sample chamber after the fluid sample has been received therein. In this case, the fluid sample may be displaced from the sample chamber via a suitable port formed in the housing, e.g. via the sample inlet or depressurisation port mentioned above. In other examples, the fluid sample may be displaced back into the flowline. Where an interface between two media of the fluid sample in the sample chamber is detected at a position where sub-sampling of one of the media separately from the others is not possible, the pressure control barrier may be moved within the housing in order to move the fluid sample such that the particular media is brought into alignment with a particular side port, so that sub-sampling of that media separately from the others is possible. In some examples, it might be desirable to displace all of the fluid sample from the sample chamber so that the sampling process can be repeated and another fluid sample can be taken from the flowline.

A small volume of suitable material may be provided on an inside surface of the housing at the location of the side ports so that the seal between the pressure control barrier and housing may be sufficiently maintained as the pressure control barrier travels across the side ports. In some examples, the suitable material may comprise a mixture of methanol, ethylene and glycol, which may be referred to as "MEG".

A measurement device may be provided for connection to one or more of the side ports. The measurement device may be configured to determine certain properties of the media adjacent the side port. For example, the measurement device may comprise means for determining density, viscosity, permittivity, salinity, pH, percentage of hydrogen, etc., of the media. For example, the measurement device may comprise a Coriolis flowmeter or a density meter.

In some examples, a number of apparatus in accordance with the present disclosure may be provided together for sampling fluid from a flowline. For example, in one configuration, a first apparatus may be connected to the flowline and a second apparatus may be connected to the first apparatus such that a sample of one or more media from the first apparatus may be received in the second apparatus. The second apparatus may be used to perform testing of the one or more media taken from the first apparatus. In one example application, a first apparatus may be used to determine an interface level between two or more media of the fluid sample in the sample chamber, and the second apparatus may be used to obtain a sub-sample of one of the media (e.g. a gas) separately from the others such that a permittivity of that particular media can be determined.

An aspect of the present disclosure relates to a method for sampling a fluid from a flowline, comprising:

providing an apparatus comprising a housing, a pressure control barrier moveably mounted in the housing, a sample chamber within the housing on a first side of the pressure control barrier and a pressure control chamber within the housing on an opposite second side of the pressure control barrier;

fluidly connecting the sample chamber to the flowline and receiving fluid from the flowline in the sample chamber;

controlling a rate at which the fluid is received in the sample chamber to expand the sample chamber and drive the pressure control barrier in a direction to reduce the volume of the pressure control chamber; and determining a property of the fluid sample using a guided wave radar device.

The method may comprise using the guided wave radar level device to determine an interface level between two or more media of the fluid sample. The method may comprise using the guided wave radar device to determine a permittivity of the fluid sample. The method may comprise sending an electromagnetic signal (e.g. a microwave signal) through a probe rod of the guided wave radar device. The method may comprise receiving a return electromagnetic signal reflected at the interface level between the two or more media. The method may comprise receiving a return electromagnetic signal reflected at a known point of the probe rod.

The method may comprise receiving the fluid in the sample chamber having properties corresponding to the properties of the fluid in the flowline. For example, such properties may relate to pressure, temperature, density, viscosity, etc. The method may comprise providing the pressure control chamber with a buffer fluid. The method may comprise controlling a pressure of the buffer fluid to control the rate at which the fluid is received in the sample chamber.

The method may comprise operating a hydraulic accumulator to control the pressure of the buffer fluid. The method may comprise controlling the hydraulic accumulator with a control module configured to receive a signal indicative of at least one of a pressure inside the flowline, a pressure inside the sample chamber and a pressure inside the pressure control chamber. The method may comprise operating a choke valve to control the pressure of the buffer fluid.

The method may comprise maintaining or modifying a temperature of the fluid sample in the sample chamber.

The method may comprise depressurising the sample chamber, when the apparatus is disconnected from the flowline. The method may comprise monitoring and controlling the reduction of pressure inside the sample chamber. The method may comprise determining a new interface level between the two or more media of the fluid sample, at reduced pressure. The method may comprise calculating a shrinkage factor of one or more media (e.g. oil) of the fluid sample.

An aspect of the present disclosure relates to a method for sampling a multiphase fluid from a flowline, comprising:

providing an apparatus comprising a housing, a pressure control barrier moveably mounted in the housing, a sample chamber within the housing on a first side of the pressure control barrier and a pressure control chamber within the housing on an opposite second side of the pressure control barrier;

fluidly connecting the sample chamber to the flowline and receiving the multiphase fluid from the flowline in the sample chamber;

controlling a rate at which the multiphase fluid is received in the sample chamber to expand the sample chamber and drive the pressure control barrier in a direction to reduce the volume of the pressure control chamber; and determining a property of the multiphase fluid sample using a guided wave radar device.

An aspect of the present disclosure relates to an apparatus for sampling a fluid from a flowline, the apparatus comprising:

a housing;

a pressure control barrier moveably mounted in the housing;

a sample chamber within the housing on a first side of the pressure control barrier and being fluidly connectable to the flowline for receiving a fluid sample from the flowline;

a pressure control chamber within the housing on an opposite second side of the pressure control barrier, wherein pressure applied within the pressure control chamber controls pressure of the fluid sample within the sample chamber; and an interface detector for determining an interface level between two or more media of the fluid sample within the sample chamber.

Providing the apparatus with an interface detector may provide a number of advantages. For example, the ability to obtain information on the level of each media in the sample at the location of sampling may enable a quick decision to be made as to the processing of the sample. In one scenario, for example, it might be determined that the sample contains only a certain media that does not require further testing or processing. It might therefore be advantageous in this case to dispose of the sample at the location of sampling and avoid the cost and time associated with transporting the apparatus to a separate processing or testing location, which might be the case if the apparatus is used at a remote location, such as an offshore oil rig. In another scenario, however, it might be determined that the sample contains a sufficient volume of a different media requiring further analysis of the sample, and therefore that transportation to another location is indeed necessary.

The flowline may be associated with wellbore operations, such as the production of hydrocarbons and associated components (such as water, solids etc.) from a wellbore, the production of water from a wellbore, the injection of fluids (e.g., water, gas etc.) into a wellbore, and the like. In this respect, the apparatus may be for sampling a fluid from a well flowline. In some examples, a well flowline may be considered to be any flowline which handles fluids, with or without any solids content, which are produced from or being injected into a wellbore. The well flowline may be located at an onshore location, offshore location, topside location, subsea location, subterranean location and/or the like.

The interface detector may be for determining an interface level between two or more media of the fluid sample which may have stratified (i.e., separated) within the sample chamber.

The apparatus may be configured to sample a multiphase fluid from a flowline, which may comprise a mixture of liquids, gases and solids. In one example, the fluid may comprise a mix of oil, gas, water and/or solids.

The fluid in the flowline may be at a pressure of around 50 bar and 60° C. The pressure control chamber may be used to control a rate at which fluid is received within the sample chamber such that the fluid sample may be maintained in the sample chamber at a desired pressure, e.g. a pressure corresponding to that of the fluid in the flowline. When the fluid is initially sampled, there may be a certain volume of a solute (e.g. gas) in solution in a solvent (e.g. oil) in the sample chamber. Therefore, another benefit of providing the apparatus with an interface detector is that the shrinkage factor of a certain media (e.g. oil) in the fluid sample can be determined, as will be described in more detail below.

The apparatus may be configured to permit depressurisation of the sample chamber. The apparatus may be configured to be depressurised (e.g. to a target pressure) such that some or all of one or more media in the sample chamber may be expelled therefrom. For example, during depressurisation of the sample chamber, some or all of the gas in solution may separate from the oil and rise above an oil-gas interface defined between the two media, e.g. into a gas plenum or gas cap. At this point, the interface detector can take another reading to determine any change in the level of the oil-gas interface. This information can be used to calculate a new volume of each media in the fluid sample, at reduced pressure, and therefore the shrinkage factor of the certain media can be determined without requiring laboratory testing; that is, the apparatus may be provided with all components necessary to determine the shrinkage factor. Such measurements can provide useful information on the content of the fluid sample, enabling quick operational decisions to be made as to the processing of the sample. In example applications relating to the oil and gas industry, a more accurate oil content can be understood or derived from the flowline, taking into account the shrinkage factor of the oil, which for example may enable or assist with fiscal metering processes.

It will be appreciated here that the apparatus may be equally used in any number of other applications outside of the oil and gas industry. Moreover, it should be noted that any reference herein to "top", "down", "up" or "bottom" should be understood as in relation to gravity.

Furthermore, it will be appreciated that in use the apparatus may be oriented such that reliable readings of an interface level between two media in the fluid sample can be taken. For example, it might be important that the apparatus is oriented vertically with respect to gravity so that separation or stratification of the two or more media of the fluid sample may be consistently achieved (i.e. due to differences in density of the media).

The apparatus may comprise a stand assembly, to permit appropriate self-support of the apparatus in a desired orientation. In some examples, the sampling apparatus may be configured to be mounted on the flowline, for example via a clamping system, strap system etc.

The interface detector may comprise any suitable means for detecting an interface between two or more media within the fluid sample. For example, the interface detector may comprise an acoustic transceiver to send an acoustic signal through the sample chamber. When the acoustic signal reaches an interface (e.g. between two media such as oil and gas) a portion of the acoustic signal may be reflected due to differences in the acoustic impedance of the different media. The acoustic transceiver may also be configured to receive a return acoustic signal indicative of a distance between the acoustic transceiver and the interface. This information may be used in a time-of-flight calculation to determine a level or height of the interface. In other examples, an acoustic transmitter and a separate acoustic receiver may be provided instead of the acoustic transceiver.

The interface detector may comprise a guided wave radar device. The guided wave radar level may comprise a probe rod. The probe rod may extend within the housing. The probe rod may extend through a bore formed through the pressure control barrier. The guided wave radar device may be operated by sending electromagnetic signals (e.g. microwave signals) through the probe rod. A transceiver may be provided in connection with the probe rod. The transceiver may be configured for sending the electromagnetic signals through the probe rod. The transceiver may also be configured for receiving a return electromagnetic signal reflected at the interface level between two media having different characteristics (such as a dielectric constant).

The provision of a guided wave radar device may provide a number of advantages. For example, as the electromagnetic signals travel at the speed of light through the probe rod, the determination of the interface level is independent of certain characteristics of the different media within the sample chamber, such that more accurate time of flight or time domain reflectometry may be utilised. Therefore, in some examples a guided wave radar device may be preferred over an acoustic transceiver arrangement whose measurements would be dependent on the speed of sound in each of the media, which may vary based on the conditions of the media, such as temperature, etc. Moreover, a guided wave radar device may be unaffected by changes in the properties of the media in the fluid sample, such as changes in temperature, density, viscosity, etc., thereby providing more accurate and consistent readings.

The apparatus may be configured to obtain a sample of fluid having properties corresponding to the properties of the fluid in the flowline. For example, such properties may relate to pressure, temperature, density, viscosity, etc. The fluid may be maintained at constant pressure and/or temperature during the sampling process to obtain a sample at the same pressure and/or temperature as the fluid in the flowline. This may enable a sample to be obtained at flowline conditions.

The pressure control chamber may be configured to control a rate at which fluid enters the sample chamber. The pressure control chamber may be provided in fluid communication with a pressure control arrangement. The pressure control arrangement may be configured to control a rate at which fluid enters the sample chamber.

The pressure control chamber may contain a buffer fluid. The buffer fluid may provide a back pressure against the flow of fluid entering the sample chamber from the flowline. The back pressure may help to maintain a constant pressure of fluid as the fluid from the flowline enters the sample chamber. This may enable the fluid to be sampled at (exactly or approximately) the same pressure as the fluid in the flowline.

In one example, the pressure control arrangement may comprise a hydraulic accumulator. The hydraulic accumulator may be in fluid communication with the pressure control chamber. The hydraulic accumulator may be controlled by a control module. The control module may be configured to receive a signal indicative of a pressure inside the flowline. The control module may be configured to receive a signal indicative of a pressure inside the sample chamber. The control module may be configured to receive a signal indicative of a pressure inside the pressure control chamber. The control module may be configured to instruct the hydraulic module to operate in accordance with one or more of the received pressure signals.

The buffer fluid may be in fluid communication with the hydraulic accumulator. The pressure control arrangement may be configured to permit the buffer fluid to be displaced from the pressure control chamber (e.g. when the pressure in the sample chamber is sufficiently high to drive the pressure control barrier to reduce the volume of the pressure control chamber). The control module may be configured to monitor and control a pressure of buffer fluid in the pressure control chamber, such that a rate of fluid flowing into the sample chamber may be regulated and controlled.

The pressure control arrangement may also be configured to deliver the buffer fluid to the pressure control chamber. In other examples, a dedicated filling port may be provided on the housing for the buffer fluid to be delivered to the pressure control chamber. A suitable pump may be provided to deliver the buffer fluid at a certain pressure to the pressure control chamber. The pressure of the buffer fluid may be selected in accordance with expected operating conditions of the apparatus, e.g. an expected pressure of the fluid to be received in the sample chamber. In some examples, the apparatus may be provided pre-charged with pressurised buffer fluid.

In some examples, it might be desirable to provide the buffer fluid at approximately the same pressure as the fluid in the flowline. Then, when it is required to take a sample of fluid from the flowline, the pressure of the buffer fluid may be reduced to achieve an acceptable rate of fluid flow into the sample chamber.

The pressure control arrangement may comprise a choke valve. The choke valve may be configured to control a rate at which the buffer fluid is displaced from the pressure control chamber. The buffer fluid may be selected to have one or more properties that enable a particular back pressure to be achieved, such as a particular density, viscosity, etc. Furthermore, a dimension of the choke valve may be selected to provide a particular flow regime as the buffer fluid exits the pressure control chamber through the choke valve.

The pressure control chamber may comprise mechanical means for controlling the rate at which the buffer fluid is displaced from the pressure control chamber. The mechanical means may comprise a rotary arrangement. For example, the rotary arrangement may comprise a helical screw and a plate. The plate may be configured to rotate relative to the helical screw to produce linear movement thereof within the housing. The rate of fluid flow into the sample chamber may be controlled by the linear movement of the plate.

The apparatus may be provided with means for maintaining or modifying a temperature of the fluid sample in the sample chamber. The apparatus may be provided with means for maintaining or modifying a temperature of the buffer fluid in the pressure control chamber. For example, a thermal jacket, blanket, tape, etc., may be suitably provided to maintain and/or modify a temperature of the fluids. The temperature of the fluid sample may be controlled in accordance with a required temperature change to calculate the shrinkage factor of one or more media (e.g. oil) of the fluid sample.

The sample chamber may comprise a sample inlet. The sample inlet may be configured to permit fluid from the flowline to enter the sample chamber. The sample inlet may be selectively openable. The sample inlet may comprise a valve. The valve may be configured to open and close the sample inlet. In some examples, the sample inlet may comprise a non-return valve. The sample inlet may comprise a port or an orifice, etc instead of or in combination with the valve. The sample inlet may be connectable to the flowline. In one example, the sample inlet may also be configured to depressurise the sample chamber, when the apparatus is disconnected from the flowline. In other examples, however, the apparatus may alternatively or additionally be provided with a separate depressurisation port or valve.

The apparatus may include a pressure relief valve to prevent over-pressurisation of the sample chamber above a certain value. The apparatus may be provided with a gauge for indicating a pressure and/or temperature inside the sample chamber. The gauge may help to monitor and control the reduction of pressure inside the sample chamber.

During the sampling process a volume of buffer fluid may be retained in the pressure control chamber. Thereafter, fluid communication with the sample chamber and the flowline may be stopped and the pressure control chamber may be further reduced in volume, such that the volume of the sample chamber may be increased. Consequently, the pressure of the sample chamber may be reduced, provided that a temperature of the fluid in the sample chamber is kept sufficiently constant in accordance with general gas equations. The volume of buffer fluid retained in the pressure control chamber may be determined in accordance with a required reduction in pressure to determine a shrinkage factor, i.e. to permit sufficient expansion of the sample chamber.

In some examples, the sample chamber may be depressurised such that a number of staged measurements can be taken, for example, at 50 bar, 40 bar, 30 bar, etc. This may assist in determining a shrinkage factor.

The pressure control barrier may comprise a piston member. The pressure control barrier may comprise a first (outer) sealing arrangement configured to seal against the housing. The pressure control barrier may comprise a second (inner) sealing arrangement to seal against the probe rod. The first and/or second sealing arrangements may be configured to create a seal between the sample chamber and pressure control chamber such that any fluid received in the sample chamber is prevented from entering the pressure control chamber. By virtue of the required relative movement between the piston and the housing the sealing arrangements may define dynamic sealing arrangements. The sealing arrangements may be bi-directional to ensure isolation of any pressure differential across the piston in reverse directions.

In some examples, interference between the piston and an inner surface of the housing may provide the sealing arrangement. Alternatively, or additionally, the sealing arrangement may comprise one or more sealing members, such as O-rings, chevron seal stacks, piston rings and/or the like.

The housing may comprise a housing bore, wherein the pressure control barrier may be mounted within the housing bore. The housing bore may be cylindrical. The housing bore may define the volume of the housing. The housing may comprise a cylinder, for example provided by a tubular body. The housing may be formed of any suitable material, such as a metal or metal alloy, a composite material, a polymer and/or the like. The piston may define a shape complimentary to a bore of the housing. The piston may comprise a disc piston. The piston may comprise a vane piston. The piston may be configured for sliding engagement with an inner surface of the housing. The piston may comprise one or more bearing surfaces to facilitate sliding engagement.

The housing may be sized in accordance with the volume of fluid to be sampled from the flowline. Additionally or alternatively, the housing may be sized in accordance with the volume of buffer fluid in the pressure control chamber required to provide sufficient control over the flow of fluid entering the sample chamber. In some examples, the housing may be sized such that the sample chamber can receive 1 litre, 2 litres, 4 litres, 8 litres, etc., of fluid from the flowline.

The pressure control barrier may be provided with a position indicator. The position indicator may indicate a position of the pressure control barrier in the housing. The position indicator may indicate a volume of fluid which has entered the sample chamber. The position indicator may indicate a volume of buffer fluid which has been displaced from the pressure control chamber. In one example, the position indicator may comprise a magnet fixed to the pressure control barrier. The magnet may be configured to cooperate with a magnetic follower located externally on the housing (or at least visible externally of the housing), such that the indicator follower can indicate the position of the pressure control barrier in the housing. However, other position indicators may alternatively or additionally be used.

In some examples, the apparatus may be operated by observing the position indicator of the pressure control barrier and modifying the rate at which the position indicator (and the pressure control barrier) moves relative to the housing, and therefore modifying the rate at which fluid enters the sample chamber, e.g. by controlling the pressure of the buffer fluid.

The apparatus may include one or more side ports. The side ports may be arranged along a length of the housing. The side ports may permit one or more sub-samples of fluid to be taken from the sample chamber. As such, the side ports may be defined as drain ports. For example, since the height or level of an interface between two media can be determined using the interface detector, it can be known which media is present at the height or level of the one or more side ports. This may permit a sub-sample of one of the media to be removed separately from the others, permitting individual processing and testing of each media if required. Moreover, this may allow the sub-sample to be certified at the location of sampling for certain types of transportation, as well as enabling samples to be allocated for certain types of full-composition laboratory tests.

A small volume of suitable material may be provided on an inside surface of the housing at the location of the side ports so that the seal between the pressure control barrier and housing may be sufficiently maintained as the pressure control barrier travels across the side ports.

A measurement device may be provided for connection to one or more of the side ports. The measurement device may be configured to determine certain properties of the media adjacent the side port. For example, the measurement device may comprise means for determining density, viscosity, permittivity, salinity, pH, percentage of hydrogen, etc., of the media. For example, the measurement device may comprise a Coriolis flowmeter or a density meter.

In some examples, a number of apparatus in accordance with the present disclosure may be provided together for sampling fluid from a flowline. For example, in one configuration, a first apparatus may be connected to the flowline and a second apparatus may be connected to the first apparatus such that a sample of one or more media (e.g. of gas) from the first apparatus may be received in the second apparatus.

The second apparatus may be used to perform testing of the one or more media taken from the first apparatus.

An aspect of the present disclosure relates to a method for sampling a fluid from a flowline, comprising:

providing an apparatus comprising a housing, a pressure control barrier moveably mounted in the housing, a sample chamber within the housing on a first side of the pressure control barrier and a pressure control chamber within the housing on an opposite second side of the pressure control barrier;

fluidly connecting the sample chamber to the flowline and receiving fluid from the flowline in the sample chamber;

controlling a rate at which the fluid is received in the sample chamber to expand the sample chamber and drive the pressure control barrier in a direction to reduce the volume of the pressure control chamber; and determining an interface level between two or more media of the fluid sample.

The method may comprise using a guided wave radar device to determine the interface level between the two or more media of the fluid sample. The method may comprise sending electromagnetic signals (e.g. microwave signals) through a probe rod of the guided wave radar device. The method may comprise receiving a return electromagnetic signal reflected at the interface level between the two or more media.

The method may comprise using an acoustic transceiver to determine the interface level between the two or more media of the fluid sample. The method may comprise sending acoustic signals through the sample chamber. The method may comprise receiving a return acoustic signal reflected at the interface level between the two or more media.

The method may comprise receiving the fluid having properties corresponding to the properties of the fluid in the flowline. For example, such properties may relate to pressure, temperature, density, viscosity, etc. The method may comprise providing the pressure control chamber with a buffer fluid. The method may comprise controlling a pressure of the buffer fluid to control the rate at which the fluid is received in the sample chamber.

The method may comprise operating a hydraulic accumulator to control the pressure of the buffer fluid. The method may comprise controlling the hydraulic accumulator with a control module configured to receive a signal indicative of at least one of a pressure inside the flowline, a pressure inside the sample chamber and a pressure inside the pressure control chamber. The method may comprise operating a choke valve to control the pressure of the buffer fluid.

The method may comprise maintaining or modifying a temperature of the fluid sample in the sample chamber.

The method may comprise depressurising the sample chamber, when the apparatus is disconnected from the flowline. The method may comprise monitoring and controlling the reduction of pressure inside the sample chamber. The method may comprise determining a new interface level between the two or more media of the fluid sample, at reduced pressure. The method may comprise calculating a shrinkage factor of one or more media (e.g. oil) of the fluid sample.

An aspect of the present disclosure relates to a method for sampling a multiphase fluid from a flowline, comprising:

providing an apparatus comprising a housing, a pressure control barrier moveably mounted in the housing, a sample chamber within the housing on a first side of the pressure control barrier and a pressure control chamber within the housing on an opposite second side of the pressure control barrier;

fluidly connecting the sample chamber to the flowline and receiving the multiphase fluid from the flowline in the sample chamber;

controlling a rate at which the multiphase fluid is received in the sample chamber to expand the sample chamber and drive the pressure control barrier in a direction to reduce the volume of the pressure control chamber; and determining an interface level between two or more phases of the multiphase fluid.

BRIEF DESCRIPTION OF DRAWINGS

These and other aspects of the present disclosure will now be described, by way of example only, with reference to the accompanying drawings, in which.

DETAILED DESCRIPTION

Aspects of the present disclosure relate to apparatus and methods for sampling a fluid from a flowline. Multiple applications may be possible and may facilitate sampling of a fluid from any flowline for any purpose. For the purposes of providing an exemplary application, the following description relates to sampling a quantity of fluid from a well flowline, which accommodates the flow of fluids and material produced from a subterranean reservoir. As is typical of many producing wells, the produced fluid may be composed of multiple media components, such as oil, water, gas and/or solids. In such a case, the produced fluids may be defined as multiphase fluids.

Figure 1:
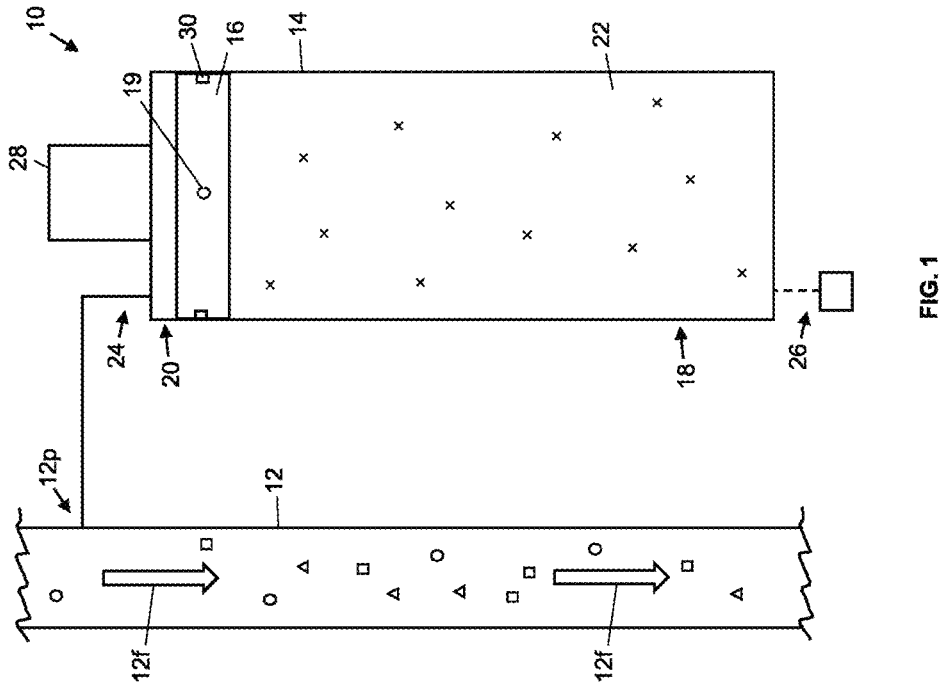
FIG. 1 is a diagrammatic illustration of an apparatus for sampling a fluid from a flowline, wherein the apparatus is connected to the flowline.

Referring to FIG. 1, a sampling apparatus 10 is illustrated which is connected to a flowline and arranged to receive a sample of fluid therefrom. In the present example, the apparatus 10 is connected to a port 12p of a flowline 12 associated with an oil and gas well. Therefore, the flowline 12 may comprise a mixture of oil, gas, water and solids, flowing in the direction of arrow 12f at a pressure of around 50 bar and a temperature of around 60° C. However, it will be appreciated that the apparatus 10 may be equally used in any number of other applications outside of the oil and gas industry.

The apparatus 10 comprises a housing 14, which may be cylindrical, having a pressure control barrier in the form of a piston member 16 mounted therein. The piston member 16 defines a moving barrier between a sample chamber 20 and a pressure control chamber 18 within the housing 14. The pressure control chamber 18 contains a buffer fluid 22, and the sample chamber 20 is arranged to receive a fluid from the flowline 12. A sampling inlet 24 is provided in communication with the sample chamber 20 and connected to the flowline 12, enabling fluid communication therewith. Furthermore, the pressure control chamber 18 is in fluid communication with a pressure control arrangement 26. The pressure control arrangement 26 is configured such that buffer fluid 22 can be displaced from the pressure control chamber 18 when the pressure in the sample chamber 20 is greater than the pressure in the pressure control chamber 18. Moreover, the pressure control arrangement 26 is configured to control a pressure of the buffer fluid 22 such that movement of the piston member 16 can be controlled in accordance with a pressure differential acting thereacross, i.e. based on a pressure of the fluid inside the sample chamber 20. In this way, the pressure of fluid received in the sample chamber 20 may be controlled.

In some examples, the pressure control arrangement 26 may be configured to deliver and/or pump the buffer fluid 22 into the pressure control chamber 18; however, in other examples a dedicated filling port may be provided on the housing 14 for the buffer fluid 22. Furthermore, the apparatus 10 is provided with an interface detector 28 for determining an interface level between two or more media of the fluid sample from the flowline 12, which is discussed in more detail below.

Figure 2:
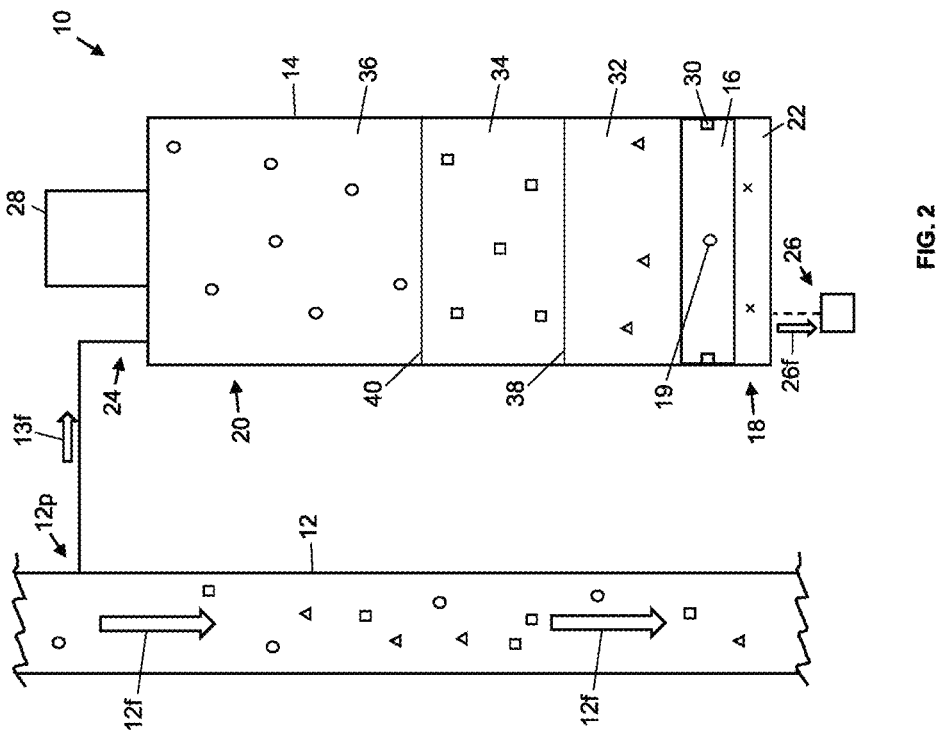
FIG. 2 is a diagrammatic illustration of the apparatus of FIG. 1, wherein the fluid from the flowline has been received in a sample chamber of the apparatus.

Referring to FIG. 2, during operation of the apparatus 10 the sampling inlet 24 is opened such that the sample chamber 20 receives a flow 13f of fluid from the flowline 12. The fluid entering the sample chamber 20 forces the sample chamber 20 to expand driving the piston member 16 in a direction to reduce the volume of the pressure control chamber 18, thereby displacing at least a portion of the buffer fluid 22 therefrom, via the pressure control arrangement 26 in the direction of arrow 26f. In this example, a portion of the buffer fluid 22 has been retained in the pressure control chamber 18, however in other examples the sample chamber 20 may expand such that all of the buffer fluid 22 is displaced from the pressure control chamber 18.

The piston member 16 is provided with an (outer) dynamic sealing arrangement 30 providing a seal between the sample chamber 20 and pressure control chamber 18, such that any fluid received in the sample chamber 20 is prevented from entering the pressure control chamber 18. Moreover, the sealing arrangement 30 is configured to provide sufficient sealing under the operating conditions of the apparatus 10.

The piston member 16 is provided with a position indicator 19 to indicate the volume of fluid which has entered the sample chamber 20 and the volume of buffer fluid 22 which has been displaced from the pressure control chamber 18. In one example, the position indicator 19 may comprise a magnet fixed to the piston member 16 and configured to cooperate with a magnetic follower located externally on the housing 14 (or at least visible externally of the housing 14), such that the indicator follower can indicate the position of the piston member 16 in the housing 14. However, other position indicators may alternatively or additionally be used.

The buffer fluid 22 may provide a back pressure against the flow of fluid entering the sample chamber 20 from the flowline 12. The back pressure may help to maintain a constant pressure of fluid as the fluid from the flowline 12 enters the sample chamber 20. This may enable the fluid to be sampled at the same pressure as the fluid in the flowline 12. Furthermore, the apparatus 10 may be provided with means for maintaining a temperature of the fluid received in the sample chamber 20. This may enable a sample to be obtained at flowline conditions, enabling specific tests to be performed.

Figure 3:
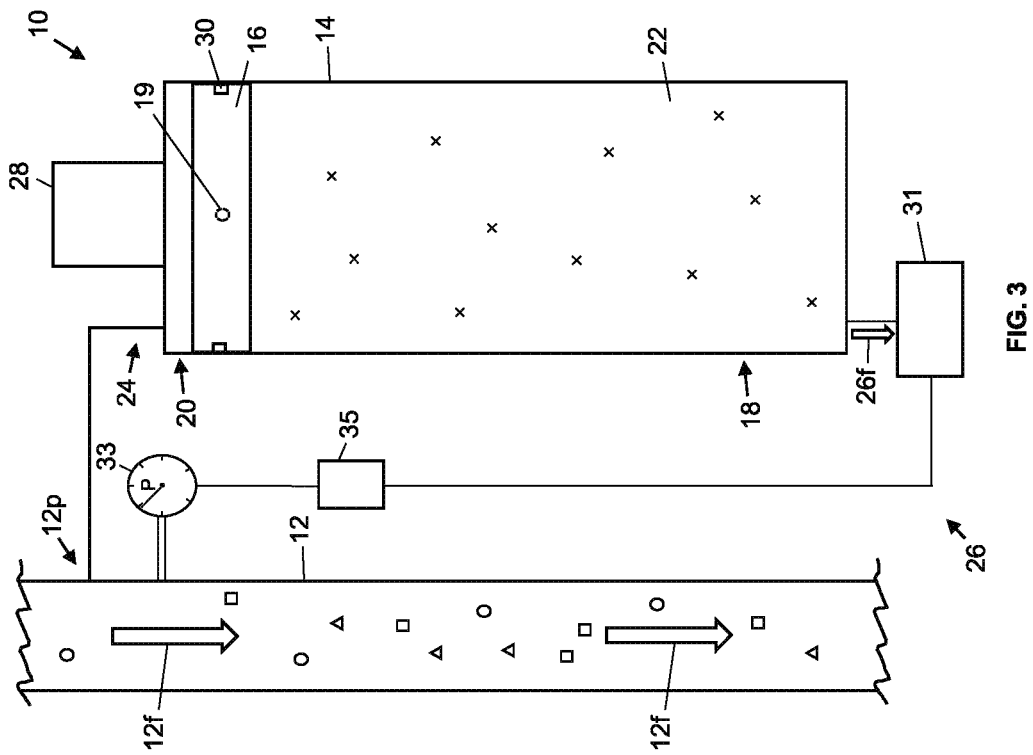
FIG. 3 is a diagrammatic illustration of the apparatus of FIG. 1, wherein a pressure control arrangement comprises a hydraulic accumulator.

In one example, illustrated in FIG. 3, the pressure control chamber 18 is provided in fluid communication with a hydraulic accumulator 31. The hydraulic accumulator 31 is configured to monitor and control a pressure of buffer fluid 22 in the pressure control chamber 18, such that a rate of fluid flowing into the sample chamber 20 is regulated and controlled. A pressure gauge 33 is provided in connection with the flowline 12 to monitor a pressure therein. A control module 35 receives a signal from the pressure gauge 33 indicative of the pressure in the flowline 12, which the control module 35 uses to instruct the hydraulic accumulator 31 to modify the pressure in the pressure control chamber 18, in accordance with the pressure in the flowline 12. Alternatively, instead of the pressure gauge 33 and control module 35, the apparatus 10 may be operated by observing the position indicator 19 of the piston member 16 and modifying the rate at which the position indicator 19 moves relative to the housing 14 by controlling the pressure of the buffer fluid 22.

Figure 4:
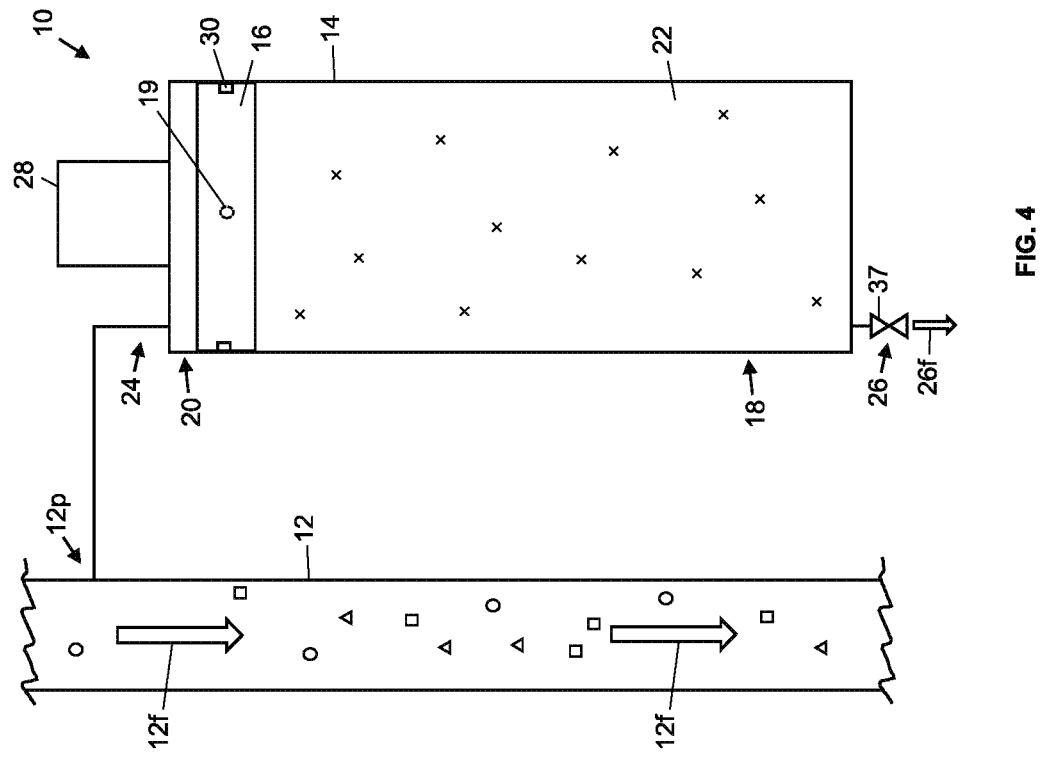
FIG. 4 is a diagrammatic illustration of the apparatus of FIG. 1, wherein an alternative pressure control arrangement comprises a choke valve.

In another example, illustrated in FIG. 4, the pressure control arrangement 26 comprises a choke valve 37 configured to control the rate at which the buffer fluid 22 is displaced from the pressure control chamber 18. The buffer fluid 22 may be selected to have one or more properties that enable said back pressure to be achieved, such as a particular density, viscosity, etc. Furthermore, a dimension of the choke valve may be selected to provide a particular flow regime as the buffer fluid 22 exits the pressure control chamber 18 through the choke valve.

Referring again to FIGS. 1 and 2, fluid entering the sample chamber 20 from the flowline 12 comprises a mix of water 32, oil 34 and gas 36. Due to differences in density, the water 32 and oil 34 are separated by a water-oil interface 38, and the oil 34 and gas 36 are separated by an oil-gas interface 40. The position indicator 19 of the piston member 16 provides an indication of the volume of fluid in the sample chamber 20, however the position indicator 19 does not provide an indication of the volume of each of the media, i.e. water 32, oil 34 and gas 36, which is contained within the sample chamber 20.

An interface detector 28 is provided to enable the volume of each media in the housing 14 to be determined. The interface detector 28 is configured such that it can determine an interface level between two or more media within the fluid sample. This may provide an indication of the level or height of each media in the housing 14, which can be used to calculate the volume of each media by multiplying the determined height by the cross-sectional area of the housing 14.

Providing the apparatus 10 with such an interface detector 28 may provide a number of advantages. For example, the ability to obtain information on the volume of each media in the sample at the location of sampling may enable a quick decision to be made as to the processing of the sample. In one scenario, for example, it might be determined that the sample contains only water and therefore it might be advantageous in this case to dispose of the sample at the location of sampling and avoid the cost and time associated with transporting the apparatus 10 to a separate testing location, which might be the case if the apparatus 10 is used at a remote location, such as an offshore oil rig. In another scenario, however, it might be determined that the sample contains a sufficient volume of oil and/or gas to require further analysis of the sample, and therefore that transportation to another location is indeed necessary.

Another benefit of providing the apparatus 10 with an interface detector 28 is that the shrinkage factor of the oil 34 may be determined. As mentioned above, the buffer fluid 22 provides a back pressure against the expansion of the sample chamber 20 such that the fluid sample may be obtained at the same pressure as the fluid in the flowline 12. Under these conditions, there may be a certain volume of gas 36 in solution in the oil 34. By depressurising the sample chamber 20 (e.g. to a target pressure) some of the gas 36 will be expelled from the sample chamber 20, reducing the overall pressure therein and allowing some or all of the gas 36 in solution in the oil 34 to separate from the oil 34 and rise above the oil-gas interface 40. At this point, the interface detector 28 can take another reading to determine any change in the level of the interfaces 38, 40. This information can be used to calculate the new volume of each media in the fluid sample, at reduced pressure, and therefore the shrinkage factor of the oil 34 can be determined. Such measurements can provide useful information on the content of sample, enabling quick operational decisions to be made. In one example, the sample inlet 24 may be used to depressurise the sample chamber 20; however, in other examples the apparatus 10 may alternatively or additionally be provided with a dedicated depressurisation port or valve. In some examples, the sample chamber 20 may be depressurised such that a number of staged measurements can be taken, for example, at 50 bar, 40 bar, 30 bar, etc.

Alternatively, during the sampling process a volume of buffer fluid 22 may be retained in the pressure control chamber 18. Then, once the apparatus 10 is no longer in fluid communication with the flowline 12, the pressure control chamber 18 may be further reduced in volume, such that the volume of the sample chamber 20 may be increased. Consequently, the pressure of the sample chamber 20 may be reduced, provided that a temperature of the fluid in the sample chamber 20 is kept sufficiently constant in accordance with general gas equations.

The interface detector 28 may comprise any suitable means for detecting an interface between two or more media within the fluid sample. For example, the interface detector 28 may comprise an acoustic transceiver configured to send an acoustic signal down through the sample chamber 20. When the acoustic signal reaches one of the interfaces 38, 40, a portion of the acoustic signal will be reflected due to differences in the acoustic impedance of the different media in the fluid sample. The acoustic transceiver may also be configured to receive a return acoustic signal. This information may be used in a time-of-flight calculation to determine a level or height of the interfaces 38, 40.

Figure 6:
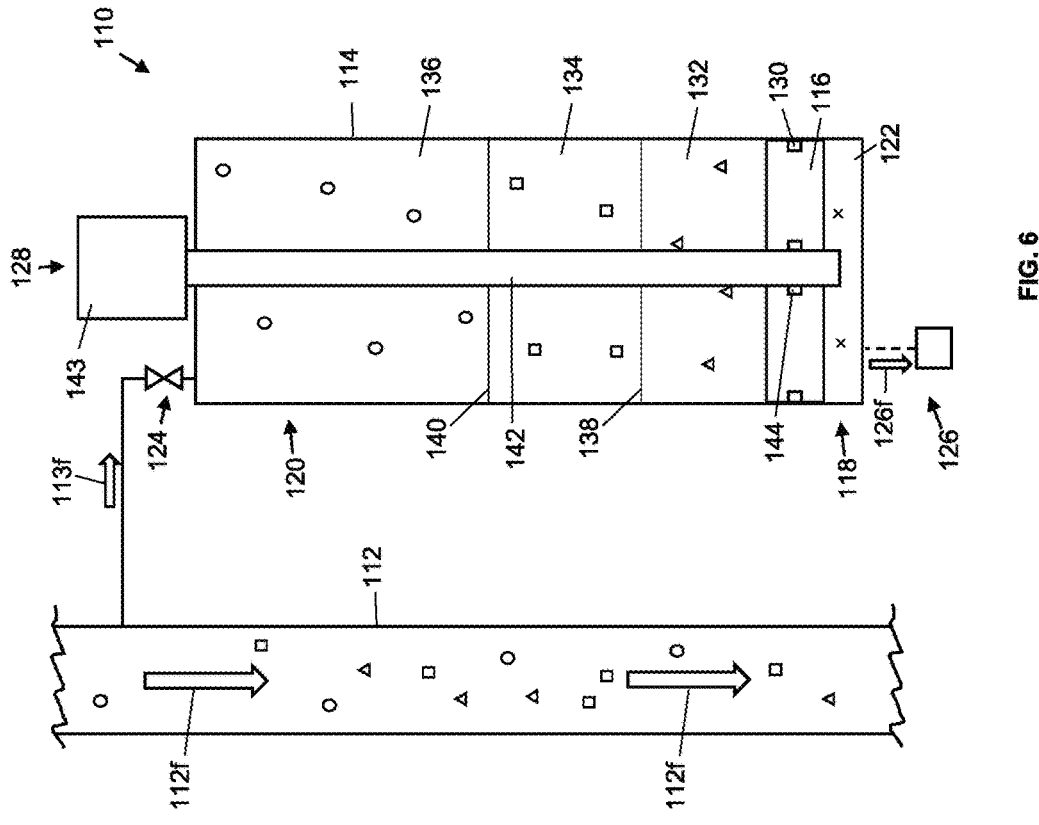
FIG. 6 is a diagrammatic illustration of the alternative apparatus of FIG. 5, wherein the fluid from the flowline has been received in a sample chamber of the alternative apparatus.
Figure 5:
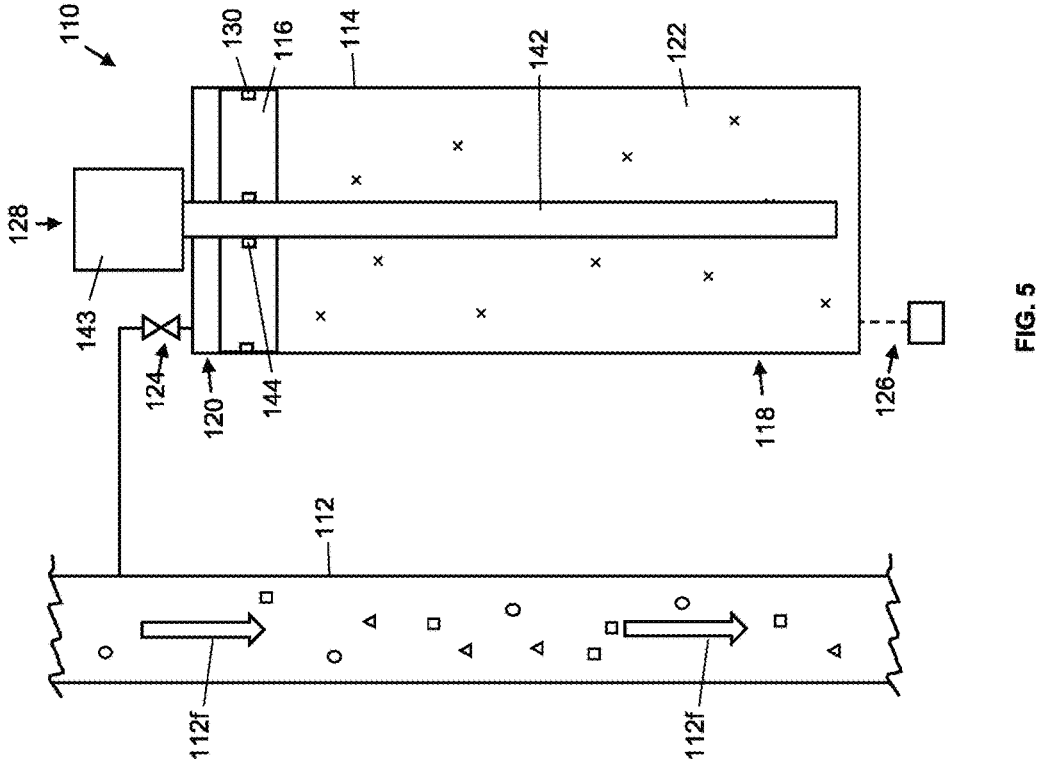
FIG. 5 is a diagrammatic illustration of an alternative apparatus for sampling a fluid from a flowline, wherein the apparatus is connected to the flowline.

FIGS. 5 and 6 illustrate an alternative sampling apparatus 110. The sampling apparatus 110 includes many of the same components as the sampling apparatus 10 described above and illustrated in FIGS. 1 and 2. Therefore, these components have not been described again here, for the sake of brevity, but have been assigned the same reference numerals as in FIGS. 1 and 2 incremented by 100.

The sampling apparatus 110 includes an interface detector 128 comprising a guided wave radar device. The guided wave radar device comprises a probe rod 142 extending through a bore formed in the piston member 116. The piston member 116 includes a second (inner) dynamic sealing arrangement 144 sealing against the probe rod 142 and providing a seal between the pressure control chamber 118 and the sample chamber 120, such that any fluid received in the sample chamber 120 is prevented from entering the pressure control chamber 118.

The guided wave radar device operates by sending an electromagnetic signal (e.g. a microwave signal) through the probe rod 142. A transceiver 143 is provided and connected to the probe rod 142. The transceiver 143 is configured for sending the electromagnetic signal through the probe rod 142 and also for receiving a return electromagnetic signal reflected at the interfaces 138, 140, due to the media having different characteristics (such as a dielectric permittivity or dielectric constant). In the illustrated example, the probe rod 142 extends from an upper region of the housing 214; however, in other examples, the probe rod 142 may extend from a lower region of the housing 214, with the transceiver 243 located at a suitable position on the housing 114.

The provision of a guided wave radar device may provide a number of advantages. For example, as the electromagnetic signal travels at the speed of light through the probe rod 142, the determined level of the interfaces 38, 40 is independent of the speed of sound in each of the media of the fluid sample. Therefore, in some examples, a guided wave radar device may be preferred over an acoustic transceiver arrangement, whose measurements would be dependent on the speed of sound in each of the media. Moreover, a guided wave radar device may be unaffected by changes in the properties of the media in the fluid sample, such as changes in temperature, density, viscosity, etc., thereby providing more accurate and consistent readings.

Figure 8:
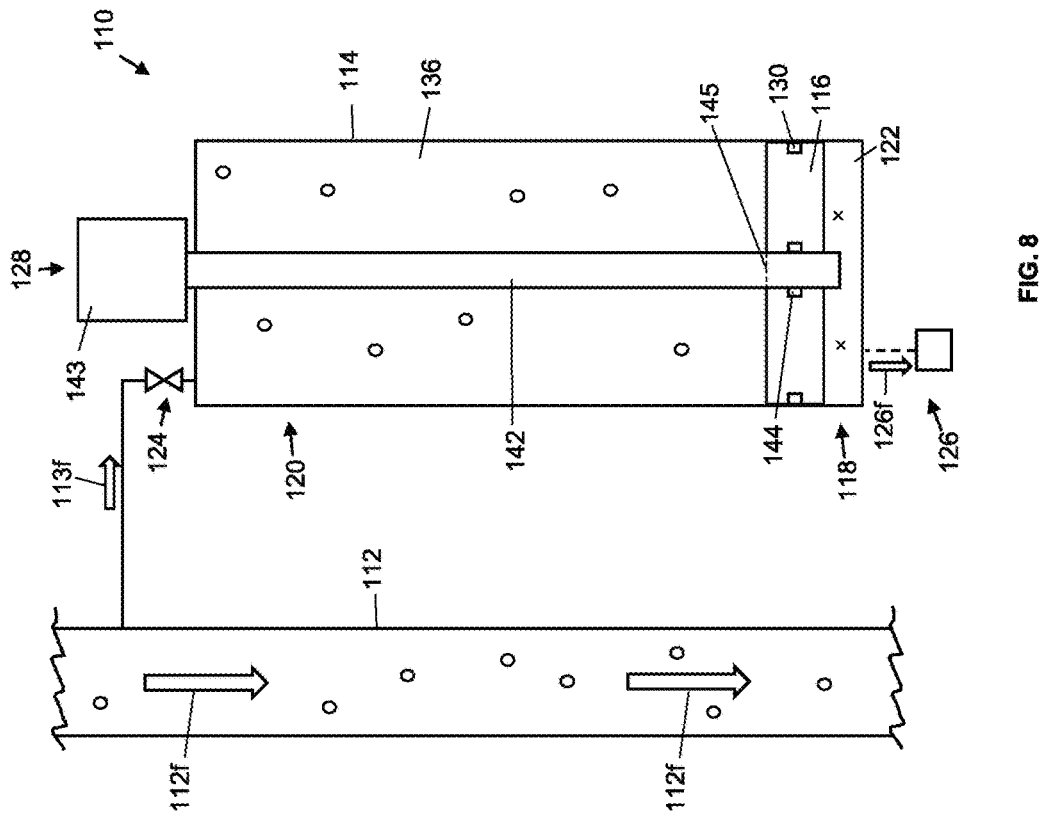
FIG. 8 is a diagrammatic illustration of the alternative apparatus of FIG. 7, wherein the fluid from the flowline has been received in a sample chamber of the alternative apparatus.
Figure 7:
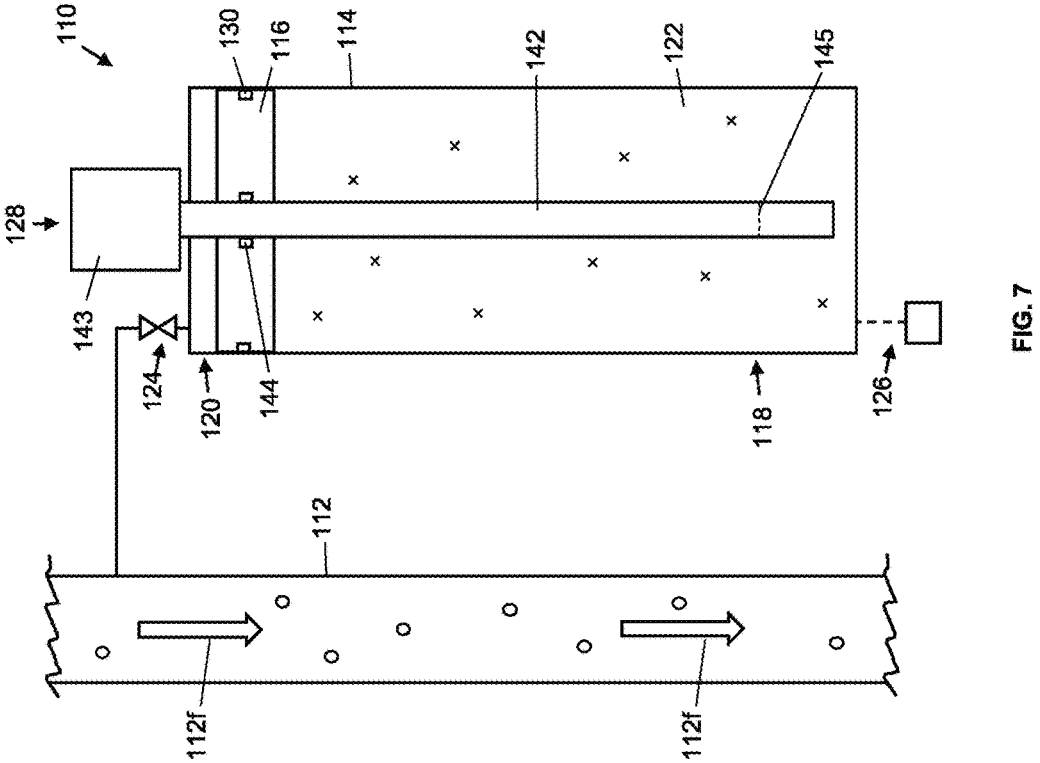
FIG. 7 is a diagrammatic illustration of the alternative apparatus of FIG. 5, wherein the apparatus is connected to a flowline containing a single media.

FIGS. 7 and 8 illustrate the apparatus of FIGS. 5 and 6, but in this example the fluid sample from the flowline 112 contains only one media, which in this case is gas 136. Here, the guided wave radar device may be used to determine a permittivity of the gas 136. To do this, the transceiver 143 sends an electromagnetic signal through the probe rod 142, which is reflected at a known point 145 of the probe rod 142 and returned to the transceiver 143. In this example, the known point 145 of the probe 143 is such that the electromagnetic signal is reflected at a point which is aligned with an upper surface of the piston member 116, when the sample chamber 120 is in a fully expanded configuration. This allows the electromagnetic signal to travel exactly the full length of the sample chamber 120 in its fully expanded configuration. The time taken for the electromagnetic signal to travel from the transceiver 143 to the known point 145 of the probe rod 142 and back to the transceiver 143 may vary in accordance with the permittivity of the gas 136. Therefore, the time measured may be used in a calculation to determine the permittivity of the gas 136.

Figures 9, 10, 11:
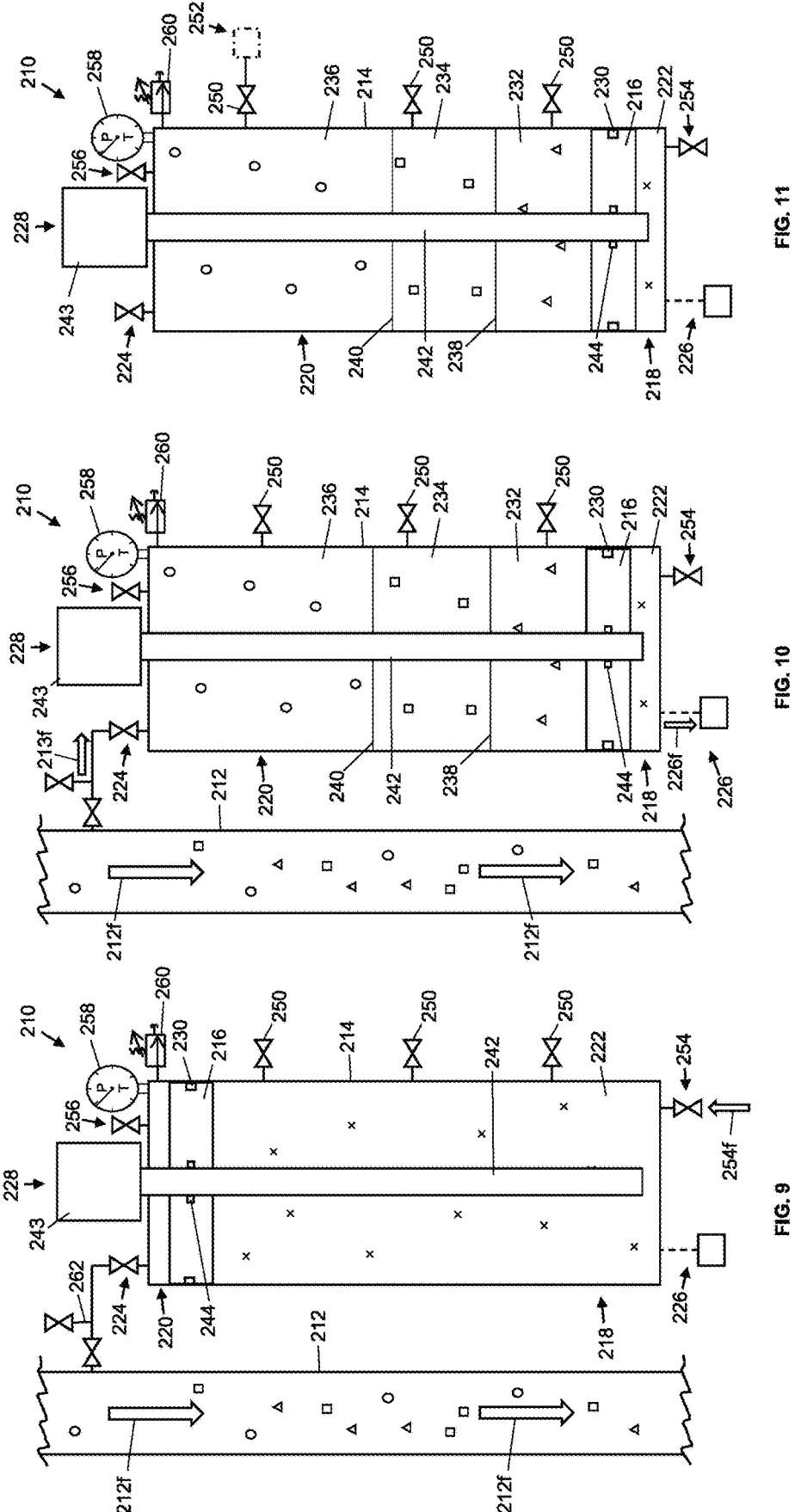
FIG. 9 is a diagrammatic illustration of a further alternative apparatus for sampling a fluid from a flowline, wherein the apparatus is connected to the flowline.
FIG. 10 is a diagrammatic illustration of the further alternative apparatus of FIG. 7, wherein the fluid from the flowline has been received in a sample chamber of the alternative apparatus.
FIG. 11 is a diagrammatic illustration of the further alternative apparatus of FIG. 7, wherein the apparatus has been disconnected from the flowline and the sample chamber has been depressurised.

FIGS. 9, 10 and 11 illustrate a further alternative sampling apparatus 210. The sampling apparatus 210 includes many of the same components as the sampling apparatus 110 described above and illustrated in FIGS. 5 to 8. Therefore, these components have not been described again here, for the sake of brevity, but have been assigned the same reference numerals as in FIGS. 5 to 8 incremented by a further 100.

The apparatus 210 includes a number of side ports 250 arranged along its length, permitting one or more subsamples to be taken from the sample chamber 220. Since the height or level of the interfaces 38, 40 can be determined using the interface detector 228, it can be known which media is present at the level of each of the side ports 250. This may permit a sub-sample of one of the media to be removed separately from the others, permitting individual processing and testing of each media if required. Moreover, this may allow the sub-sample to be certified at the location of sampling for certain types of transportation, as well as enabling samples to be allocated for certain types of full-composition laboratory tests. A small volume of suitable material may be provided on an inside surface of the housing 214 at the location of the side ports 250 so that the seal between the piston member 216 and housing 214 is sufficiently maintained as the piston member 216 travels across the side ports 250.

Alternatively or additionally, a device 252 may be provided and connected to one or more of the side ports 250. The device 252 may comprise a measurement device for determining certain properties of the media adjacent the side port 250. For example, the measurement device 252 may comprise means for determining density, viscosity, permittivity, salinity, pH, etc., of the media. In some examples, the device 252 may comprise a density meter or a Coriolis flowmeter. In other examples, the device 252 may comprise a second apparatus according to any of the apparatus described herein.

The apparatus 210 also includes a depressurisation valve 256 for depressurising the sample chamber 220, for example to calculate a shrinkage factor in accordance with the process described above. In FIG. 11, the sample chamber 220 has been depressurised such that some or all of the gas in solution in the oil 234 has separated from the oil 243 and risen above the oil-gas interface 240. As such, the volume of oil 234 has been reduced and the volume of gas 236 has increased, with the oil-gas interface 240 moving downwards. In some examples, the depressurisation valve 256 may be used to take a sub-sample from the sample chamber 220.

In some examples, where the interfaces 238, 240 are detected at a position where sub-sampling of one of the media separately from the others is not possible, the pressure in the pressure control chamber 218 may be modified to move the piston member 216 within the housing 214 in order to move the fluid sample such that the particular media is brought into alignment with one of the side ports 250, so that sub-sampling of that media separately from the others is possible. In this case, the fluid sample may be displaced from the sample chamber 220 via the depressurisation valve 256. Alternatively, the fluid sample may be displaced back into the flowline 212. In other examples, it might be desirable to displace all of the fluid from the sample chamber 220 so that the sampling process can be repeated and another fluid sample can be taken from the flowline 212.

Additionally, the apparatus 210 is provided with a gauge 258 for indicating a pressure and temperature of the fluid inside the sample chamber 220. In some examples, the gauge 258 may be configured to send signals indicative of the pressure inside the sample chamber 220 to the control module 35 for controlling the hydraulic accumulator 31 (illustrated in FIG. 3). The pressure gauge 258 may help to monitor and control the reduction of pressure inside the sample chamber 220 to determine a shrinkage factor. The apparatus 210 further includes a pressure relief valve 260 to prevent over-pressurisation of the sample chamber 220 above a certain threshold value. A purge line 262 may be provided to expel any fluid in the line connecting the apparatus 210 to the flowline 212.

The apparatus 10, 110, 210 may be provided with means for maintaining or modifying a temperature of the fluid in the sample chambers 20, 120, 220. For example, a thermal jacket, blanket, tape, etc., may be provided to maintain and/or modify a temperature of the fluid.

The invention claimed is:

1. An apparatus for sampling a fluid from a flowline, the apparatus comprising:
   a housing;
   a pressure control barrier moveably mounted in the housing;
   a sample chamber within the housing on a first side of the pressure control barrier and configured to be fluidly connectable to the flowline for receiving a fluid sample from the flowline;
   a pressure control chamber within the housing on an opposite second side of the pressure control barrier, wherein based on a pressure applied within the pressure control chamber, the pressure control chamber is configured to control a pressure of the fluid sample within the sample chamber; and a guided wave radar device configured to determine property of the fluid sample within the sample chamber.

2. The apparatus of claim 1, wherein the guided wave radar device comprises a probe rod extending within the housing.

3. The apparatus of claim 2, wherein the guided wave radar device comprises a transceiver configured to send an electromagnetic signal through the probe rod, at least a portion of the electromagnetic signal being reflected at an interface level between two or more media of the fluid sample and returned to the transceiver.

4. The apparatus of claim 2, wherein the guided wave radar device comprises a transceiver configured to send an electromagnetic signal through the probe rod, at least a portion of the electromagnetic signal being reflected at a known point of the probe rod and returned to the transceiver.

5. The apparatus of claim 2, wherein the probe rod extends through a bore formed through the pressure control barrier.

6. The apparatus of claim 1, wherein the pressure control chamber contains a buffer fluid.

7. The apparatus of claim 6, wherein the pressure control chamber is provided in fluid communication with a pressure control arrangement configured to permit the buffer fluid to be displaced from the pressure control chamber.

8. The apparatus of claim 7, wherein the pressure control arrangement comprises a hydraulic accumulator.

9. The apparatus of claim 8, wherein the hydraulic accumulator is controlled by a control module configured to receive a signal indicative of at least one of a pressure inside the flowline, a pressure inside the sample chamber and the pressure inside the pressure control chamber.

10. The apparatus of claim 7, wherein the pressure control arrangement comprises a choke valve configured to permit the buffer fluid to be displaced from the pressure control chamber.

11. The apparatus of claim 1, wherein the pressure control chamber is configured to control a rate at which the fluid enters the sample chamber.

12. The apparatus of claim 1, wherein the apparatus is configured to permit depressurisation of the sample chamber.

13. The apparatus of claim 1, wherein the pressure control barrier comprises a piston member.

14. The apparatus of claim 1, wherein the pressure control barrier is provided with a sealing arrangement configured such that any fluid received in the sample chamber is prevented from entering the pressure control chamber.

15. The apparatus of claim 1, wherein the pressure control barrier is provided with a position indicator configured to indicate a volume of fluid which has entered the sample chamber.

16. The apparatus of claim 1, wherein the apparatus includes one or more side ports arranged along a length of the housing permitting one or more sub-samples of the fluid sample to be taken from the sample chamber.

17. The apparatus of claim 1, wherein the flowline comprises a multiphase fluid.

18. A method for sampling a fluid from a flowline, comprising:

providing an apparatus comprising a housing, a pressure control barrier moveably mounted in the housing, a sample chamber within the housing on a first side of the pressure control barrier, and a pressure control chamber within the housing on an opposite second side of the pressure control barrier;

fluidly connecting the sample chamber to the flowline and receiving fluid from the flowline in the sample chamber;

controlling a rate at which the fluid is received in the sample chamber to expand the sample chamber and drive the piston member in a direction to reduce a volume of the pressure control chamber; and determining a property of the fluid sample using a guided wave radar device.

19. The method of claim 18, wherein determining a property of the fluid sample comprises determining an interface level between two or more media of the fluid sample.

20. The method of claim 19, comprising depressurising the sample chamber and determining a new interface level between the two or more media of the fluid sample.

21. The method of claim 18, wherein determining a property of the fluid sample comprises determining a permittivity of the fluid sample.

22. The method of any one of claim 18, comprising providing the pressure control chamber with a buffer fluid.

23. The method of claim 22, comprising at least one of operating a hydraulic accumulator or a choke valve to control the pressure of the buffer fluid.

* * * * *